United States Patent [19]
Wanstrath

[11] Patent Number: 5,626,261
[45] Date of Patent: May 6, 1997

[54] RESIN INJECTOR GUIDE FOR WINDSHIELD CRACK REPAIR

[75] Inventor: Daniel M. Wanstrath, Durango, Colo.

[73] Assignee: Glass Technology Inc., Durango, Colo.

[21] Appl. No.: 548,232

[22] Filed: Oct. 25, 1995

[51] Int. Cl.⁶ ............................................. B67D 5/06
[52] U.S. Cl. .................................. 222/181.2; 118/256
[58] Field of Search .......................... 222/181.1, 181.2; 248/206.3, 298.1; 294/65; 118/207, 208, 256

[56] References Cited

U.S. PATENT DOCUMENTS

| | | | |
|---|---|---|---|
| 2,686,618 | 8/1954 | Mateer | 222/181.3 X |
| 2,856,146 | 10/1958 | Lehder | 248/298.1 X |
| 3,174,536 | 3/1965 | Francis | 248/206.3 X |
| 5,080,309 | 1/1992 | Ivins | 248/206.3 X |
| 5,402,917 | 4/1995 | Kleinhans et al. | 222/181.2 X |
| 5,431,732 | 7/1995 | Carrell et al. | 118/256 |

FOREIGN PATENT DOCUMENTS 1606431  11/1990  U.S.S.R. ................... 294/65

Primary Examiner—Joseph Kaufman
Attorney, Agent, or Firm—Kenton L. Freudenberg; Maxwell C. Freudenberg

[57] ABSTRACT

Apparatus for properly orienting a windshield crack repair resin injector over a crack and guiding the movable position of the injector along an elongated crooked path of the crack. The apparatus is secured to the windshield by several suction cups and includes a bridge structure for supporting the apparatus above and along the crack. The guiding apparatus enables the injector to move in any direction relative to the bridge structure and parallel to the windshield to follow a long crooked crack path by providing a guiding mechanism having a combination of close fitting pivoting and sliding interconnections of several connecting members between the bridge and the injector. A preferred embodiment has a single-track rail above and along the crack with a wheeled carriage movable on the rail and supporting an arm swingable parallel to the windshield and carrying an injector at its free end. A resin-dispensing end of the injector is spring biased into engagement with the windshield.

23 Claims, 8 Drawing Sheets

RESIN INJECTOR GUIDE FOR WINDSHIELD CRACK REPAIR

The present invention is in the field of tools for the repair of damage to glass, particularly laminated automotive windshields having lengthy cracks.

BACKGROUND OF THE INVENTION

Numerous tools and techniques have been developed for repair of damaged plate glass surfaces, especially those made of laminated "safety" glass such as is used in automotive windshields. The cost benefit of repairing small cracks rather than replacing an entire windshield to restore the visual integrity of the windshield is substantial. Often, windshield damage, such as that caused by impact from small rocks or gravel, is in small chips, cracks, "bullseyes" and "stars" which may be confined to a small area. The common methods of repairing such small areas have involved variations of the basic steps of (1) providing an airtight seal around the broken area (2) drawing a vacuum to remove air from the broken area and (3) introducing a suitable ultraviolet curable liquid resin into the broken area under either ambient atmospheric pressure or under a positive pressure.

However, such methods are not readily suited to repair of more extensive damage in the form of elongated cracks. While such cracks may be created as a result of impact, more commonly a crack may spread over time from smaller localized areas of damage as the result of stress created by, for example, temperature induced expansion and contraction of the glass or mechanical vibration.

In such glass repair, the success of the repair, both structurally and visually, may be primarily dependent on the extent to which the damaged area is filled with repair resin without leaving voids or air bubbles within the repaired area. In order to repair a long crack, the primary method of repair has been for a technician to manually position a resin injector over the crack and manually guide the injector along the length of the crack while feeding resin into the crack. Mechanical means is often used to flex the glass slightly to open the crack and facilitate the penetration of repair resin.

Prior art methods of crack repair have typically involved using a guide for an injector wherein the supporting structure for the guide is moved as a unit along the windshield surface to follow a crack in the glass. Because of the movement of the supporting structure, such a system necessarily creates varied stresses upon the glass and can create some degree of relative movement between the edges of the crack. Such excessive movement of the glass may also result in further damage to the glass or may cause variations n the volume of the damaged area to be filled with resin, thereby promoting entry of air into the repaired area and resulting in a poor quality repair by affecting the degree to which the crack may be completely filled. By providing a stationary support for a movable injector, the present invention allows easily controlled movement of a resin injector over the glass surface and minimizes any stress or movement of the glass. This results in minimizing the spread of the damage to the glass, helps insure complete filling of a crack with repair resin, and makes the repair process quicker and easier with more a consistent outcome.

Additionally, the present invention provides a means of maintaining consistent contact between the injector tip and the crack opening while allowing relatively free movement of the injector along the crack. Because of the need to accurately guide the injector along the crack while simultaneously maintaining contact between the injector tip and the crack opening, the prior art methods and systems of crack repair have typically required that the technician be relatively skilled or experienced to effect an acceptable repair. In contrast the present invention is intended to provide an injector guide system in which the device maintains contact between the injector tip and the crack opening without hindering the freedom of movement of the injector to follow the path of the crack, even when used by a relatively less skilled operator.

SUMMARY OF THE INVENTION

The apparatus of the present invention is intended to facilitate guiding of a resin injector along an elongated crack in a damaged windshield and to provide the operator with a means of maintaining a suitable contact and orientation of the injector with respect to the windshield surface as the injector is guided along the crack.

Typically a crack is dried and cleaned out and may be opened slightly using a mechanical crack spreading device well known in the industry and shown in U.S. Pat. No. 5,116,441 to Campfield.

A conventional resin injector body is a simple tubular structure having central reservoir chamber which holds sufficient liquid resin to fully fill a repaired area. The injector tip is sealed against the glass surface by means of a an elastomer O-ring seal which surrounds an orifice in the injector tip to allow the reservoir chamber to communicate with the damaged area. The reservoir chamber is provided with a means of discharging resin through the injector tip. The discharge means may be any of a number of well recognized methods including a simple piston-like mechanical structure operated similarly to a manual syringe or a more elaborate assembly which provides air pressure to the resin reservoir to expel resin through the injector tip.

The apparatus of the present invention comprises a bridge structure for supporting the apparatus above and along the crack and which is secured to the windshield by one or more suction cups. The guiding apparatus enables the injector to move in any direction relative to the bridge structure and generally parallel to the surface of the windshield to follow a long crooked crack path by providing a guiding mechanism having a combination of close fitting pivoting and sliding interconnections of several connecting members between the bridge and the injector. The guide mechanism maintains contact between the injector tip and the windshield surface while providing freedom of movement of the injector along the crack. Additionally because the bridge structure is fixed in position, little stress or movement is transmitted to the windshield.

A resin-dispensing end of the injector is spring biased to maintain constant engagement with the windshield. The guide apparatus comprises a wheeled carriage movable on a railed track paralleling the windshield and supporting an arm swingable relative to the carriage parallel to the windshield and carrying an injector at its free end.

It is an object of the present invention to provide an apparatus which is capable of maintaining constant contact between a resin injector and a windshield surface without significantly hindering movement of the resin injector along a crack path.

It is another object of the present invention to provide an apparatus which is capable of maintaining a relatively constant orientation between a resin injector and a windshield surface as the resin injector is moved along a crack path.

It is a further object of the present invention to provide an apparatus which is capable of stabilizing a resin injector as it is moved along a damaged windshield surface without significantly hindering movement of the resin injector along a crack path.

It is another object of the present invention to provide an apparatus which is capable of stabilizing a resin injector as it is moved along a damaged windshield surface while minimizing unnecessary stresses upon or movement of the damaged area of the windshield.

It is another object of the present invention to provide an apparatus which is capable of stabilizing a resin injector as it is moved along a damaged windshield surface to allow a less skilled operator to effect repair of an elongated crack.

DETAILED DESCRIPTION OF THE INVENTION

Figure 1:
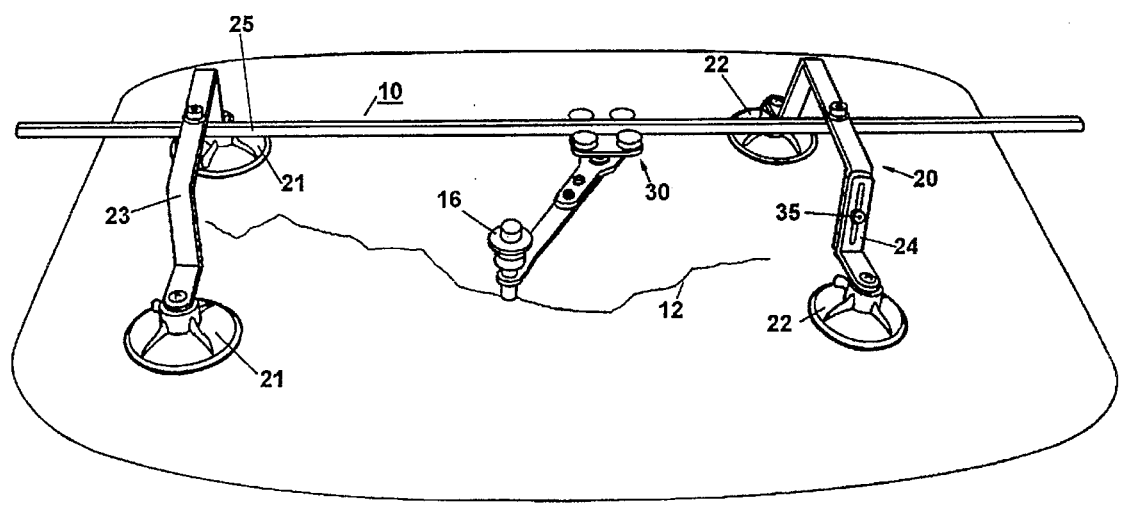
FIG. 1 is a perspective view of a preferred embodiment of windshield crack repair apparatus secured to a windshield over a crack therein to be repaired.
Figure 2:
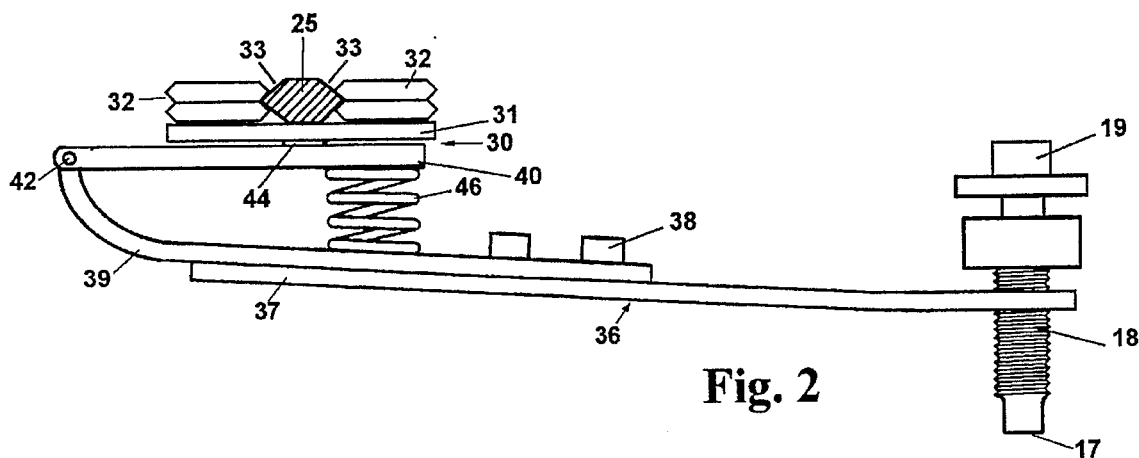
FIG. 2 is a detail side view of a carriage and spring-biased injector structure which is mounted on and slidable along a supporting rail as seen in FIG. 1.
Figure 3:
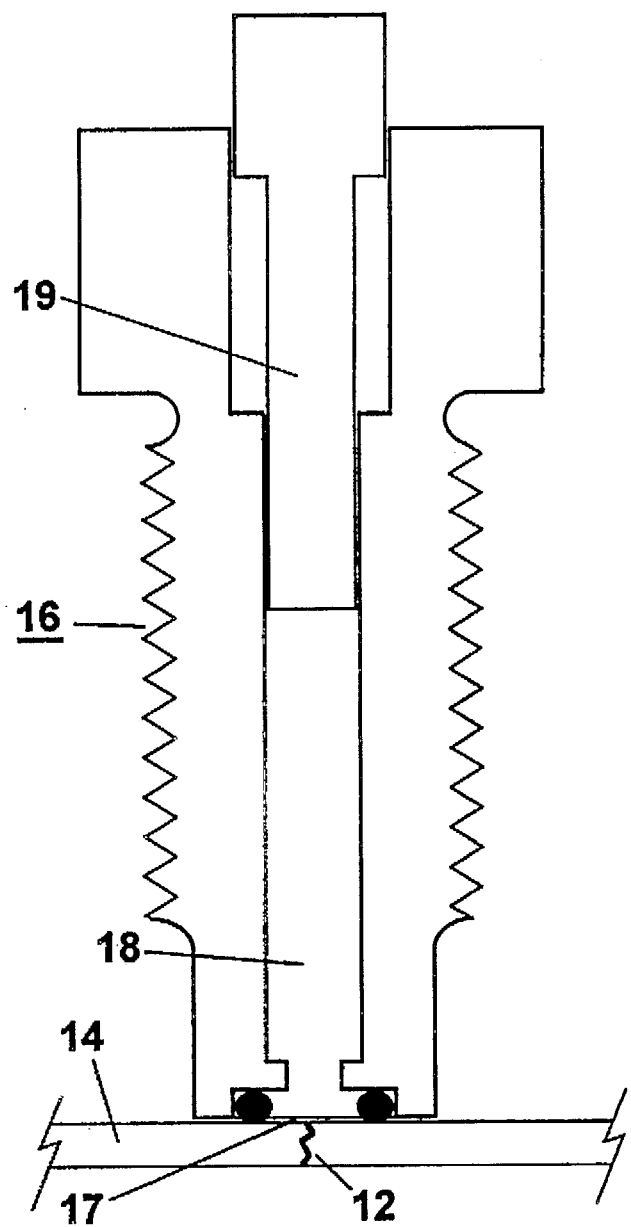
FIG. 3 is a section of an injector structure as mounted on the injector support structures of FIG. 1 and 2.
Figure 4:
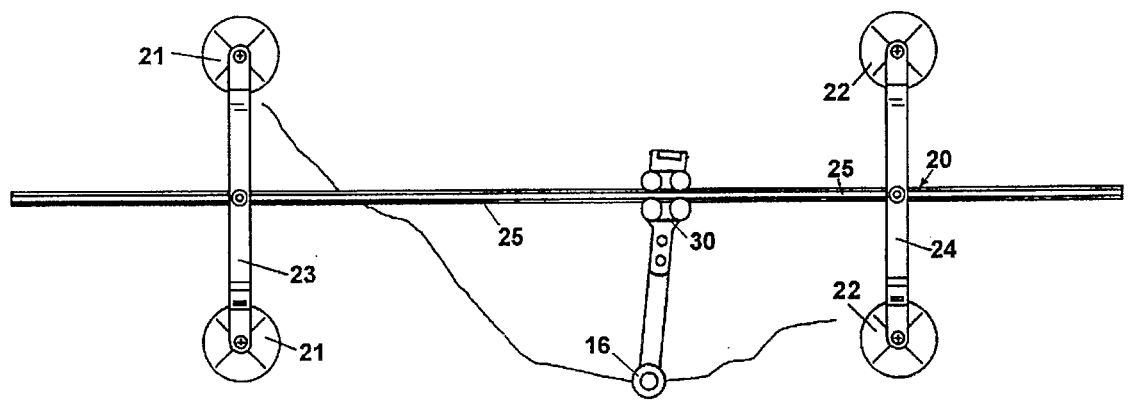
FIGS. 4–5 are views of apparatus of FIG. 1 as if looking normal to a windshield with an injector supporting arm in different angular positions to place the injector at the end of the arm different distances from the supporting rail above different points of a crack to be repaired.
Figure 5:
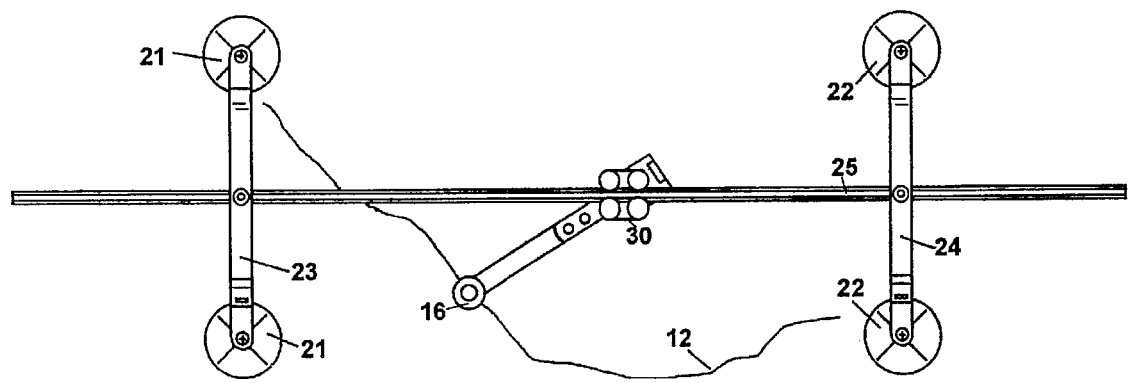

In accordance with a preferred embodiment of the invention, FIGS. 1, 3 and 4 illustrate apparatus 10 for repairing an elongated crooked crack 12 in a surface layer of vehicle windshield 14 by means of an injector 16 movable along the crack to inject a transparent filler into the crack along its length. The injector 16, as seen in FIGS. 2–3, is a conventional structure comprising a reservoir cylinder portion 18 which contains a quantity of uncured liquid resin filler to be injected from a discharge end 17 of the injector into the crack 12 under the force of a screw-type piston 19 moved axially within the cylinder toward the windshield. Alternatively a flexible tube supplying filler liquid under controlled pressure may be connected to supply such liquid to the injector.

The apparatus 10 comprises a bridge structure 20 having a plurality of pairs of suction cup feet 21 and 22 securable to the windshield at spaced points along the crack. These pairs of feet rest on the windshield and are interconnected by bridging members 23 and 24, respectively, which support in elevated spaced relationship relative to the windshield surface a guide rail structure portion of the bridge structure which has an elongated rail member 25 extending along the length of the crack 12. A movable carriage or trolley 30 is supported for rolling movement on the guide rail 25.

As seen in greater detail in FIG. 2, the injector 16 carried by the carriage 30 is secured to the carriage by interconnecting means enabling the centrally-apertured discharge end 17 of the injector 16 to be kept in contact with the windshield and properly orientated essentially normal with respect to the cracked windshield surface whereby the filler resin may be injected into the crack continuously as the injector is manually moved along the crack while the carriage is progressively moved along the guide rail 25.

Figure 6:
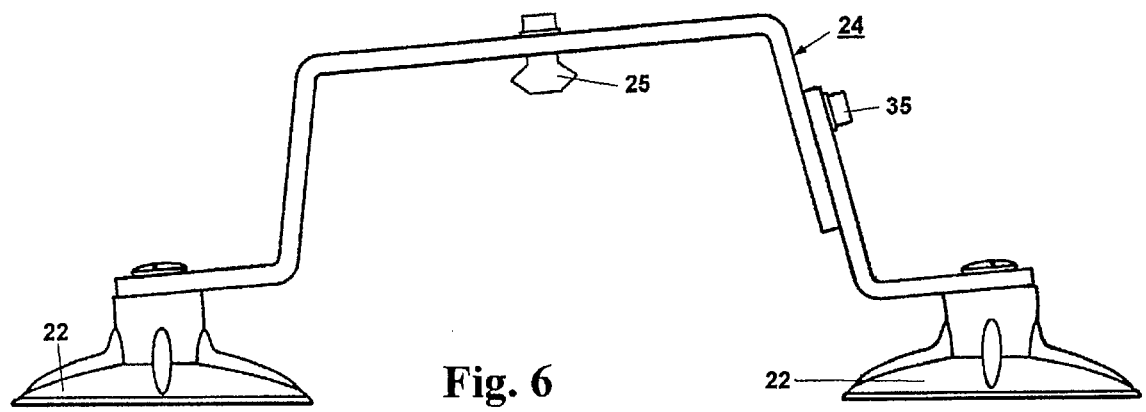
FIG. 6 is a side view of a bridging member of FIG. 1 showing an adjustable-length leg configuration.

The carriage 30 includes a plate frame member 31 which is supported on the rail 25 essentially parallel to the cracked windshield surface. The plate 31 has four pins extending therefrom to form axles for four circumferentially V-grooved follower wheels 32 which ride closely against parallel elongated dual-track supporting surfaces 33 having complementary guide edges with V-shaped cross sections. Orientation of the parallel pointed V-shaped guide edges of surfaces 33 essentially equidistant from the windshield at each location of the carriage along the rail 25 maintains the plate 31 essentially parallel to the windshield. The rail 25 is bolted to a central point of the spanning portion of each of the bridging members 23 and 24. One or more of the legs of the bridging members may be adjustable in length as seen at 35 in FIGS. 1 and 6 to select optimum relationship of the rails V-shaped guide edges as close as possible to paralleling the windshield, keeping in mind that the windshield usually has some convex curvature.

The injector 16 is supported from the carriage 30 by means of an interconnecting arm structure 36 connected between the carriage and the injector which provides means for enabling the injector to move transversely relative to the guide rail 25 and generally parallel to the windshield surface layer to be repaired as the carriage 30 moves along the rail 25. The injector cylinder is threaded into the free end of a first arm portion 37. This arm portion 37 is removably secured by means of bolts 38 to a second arm portion 39, pivotably supported from the carriage 30, to enable the length of the arm structure 36 to be selectively varied and to permit interchanging of arm portions 37 having different sizes or means for attaching injectors.

The pivotably supported arm portion 39 is pivoted at the edge of a plate support member 40 at a pivot axis 42 generally parallel to the crack 12 and parallel to the windshield surface. The plate 40 is parallel to the plate 31 and these plates are relatively rotatable connected near their centers at 44 to enable rotation of the plate 40 about an axis normal to the windshield at 44. This enables the free injector-carrying end of the arm structure 36 to be swung to vary the distance of the injector from the rail 25 during progressive movement of the carriage 30 along the rail so that the injector can be easily manipulated to follow crooked cracks. The two combined translational and rotational modes of movement of the injector 16, enabled by sliding the carriage 30 on rail 25 and rotating the carrier plate 40 and arm structure 36 relative to the carriage 30, permit the injector to be firmly supported with proper orientation relative to a crack as the injector is manually guided to trace the crack while the injector 16 continuously dispenses filler material into the crack The discharge end 17 of the injector 16 is spring-biased against the surface of the windshield during a repair operation by means of a compression coil spring 46 between arm portion 39 and plate 40. The spring may be secured to these members 39 and 40 or other stop means may be provided to limit downward swinging movement of the arm portion 39 when the apparatus is removed from the windshield.

In lieu of the follower wheels 32 in the above and other embodiments, suitable grooved or mating complementary slidable surfaces may be provided on the plate 31 and at opposite edges of the rail 25. Also the rail 25 may be formed with internal opposed inwardly facing support surfaces engaged by complementary outwardly facing grooved wheels, rollers or sliding members on the plate 31. Although the orientation of the rail 25, wheels 32 and plate 31 parallel to plate 40 as in FIG. 2 makes the apparatus more compact, a different orientation of the rail edges and wheels 32 may be chosen as long as the pivot axis 42 remains parallel to the windshield and the swing axis of arm structure 36 remains normal to the windshield as it is at 44.

Figure 7:
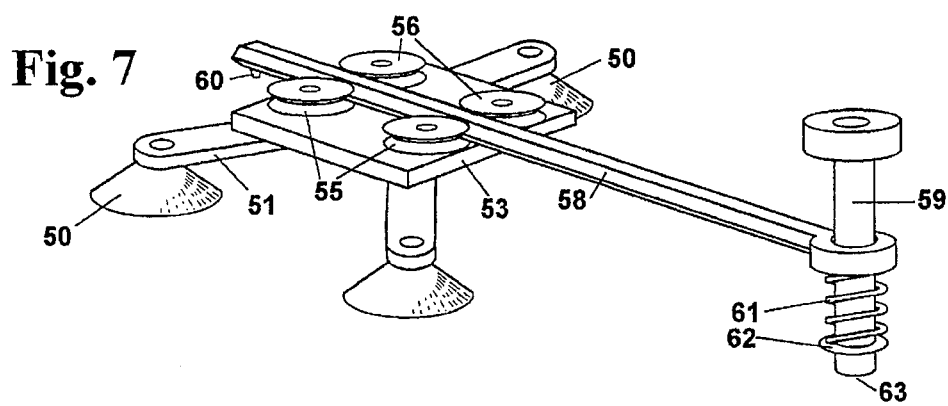
FIG. 7 is a perspective view of an alternative embodiment showing a bridge structure securable to a windshield and having a pivotable plate on the bridge structure with an elongated injector carrying rail-like arm longitudinally slidable on the plate.

The embodiment shown in FIG. 7 utilizes a tripod bridge structure having three suction cup feet 50 resting on the windshield and secured to the ends of three arms of a bridge plate 51 and providing means to secure the plate 51 to a windshield surface. A single large suction cup/foot may also be suitable for supporting the bridge plate. Pivotably supported atop the bridge plate 51 is a carrier plate 53 with the pivoting connection between plates 51 and 53 having an axis of rotation which would be normal to the windshield surface. Supported atop the carrier plate 53 are four axle members rotatably supporting two pairs of circumferentially grooved guide wheels 55 and 56, like the wheels 32 of FIG. 2, which slidably grasp a rail bar 58 having a cross section like that of the rail 25 of FIG. 1. This rail bar 58 is longitudinally slidable between the pairs of guide wheels 55 and 56 and is held thereby essentially parallel to the windshield to provide a mode of translational movement of a crack filler injector 59, similar to that of FIG. 3, carried at one end of the bar 58. The other end of the bar 58 has a removable stop projection 60 which will engage an edge of the carrier plate to prevent the bar 58 from being withdrawn inadvertently from between the guide wheels. The injector 59 in this embodiment has a smooth cylindrical outer surface and is mounted in the end of the bar 58 normal to the windshield surface by means providing sliding movement to and from the windshield with a coil spring 61 between the bar and a removable C-ring shoulder 62 on the injector to spring bias the injector so that its discharge end 63 remains firmly in contact with the windshield over a crack being repaired. The rail bar 58 can be swung over the windshield by rotation of the carrier plate 53 whereby the two combined translational and rotational modes of movement of the injector 59, enabled by sliding the bar rail 58 and rotating the carrier plate 53, permit the injector to be firmly supported with proper orientation relative to a crack as the injector is manually guided along a crack while the injector continuously dispenses filler material into the crack.

Figure 8B:
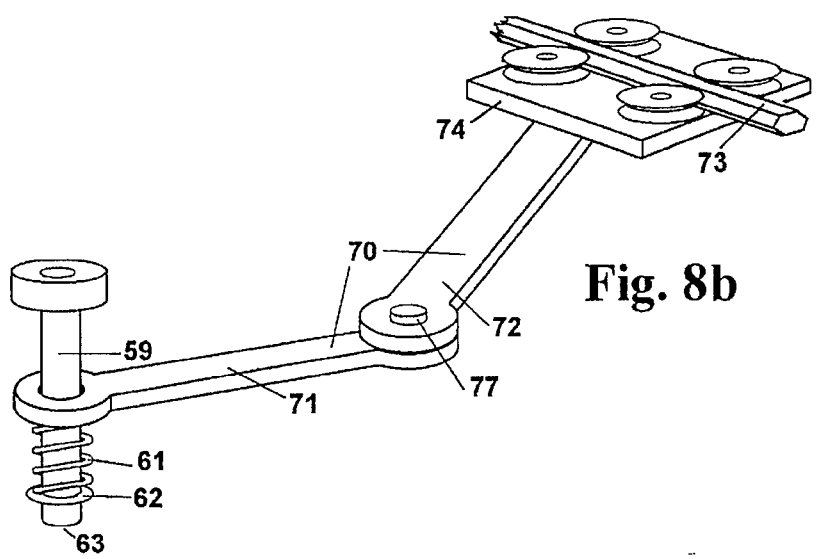
FIG. 8b is a partial perspective view of another alternative embodiment of a movable injector carriage structure with a pivotable and slidable rail-like supporting arm which is usable on a bridging rail structure as in FIG. 1.
Figure 8A:
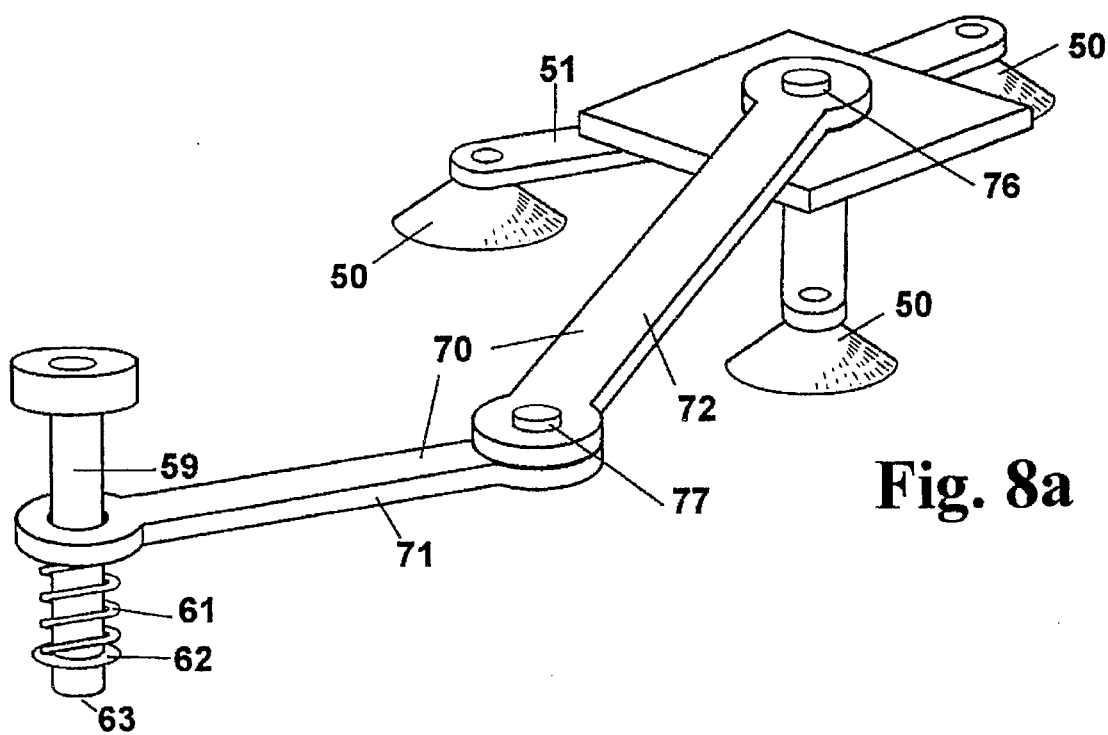
FIG. 8a is a perspective view of another alternative embodiment showing a bridge structure securable to a windshield and a movable injector guide with a pivotable supporting arm.

The embodiment of FIG. 8a uses a stationary tripod bridge structure similar to that of FIG. 7, but uses a pivoted injector guiding assembly 70 comprised of two arm members 71 and 72 with parallel generally vertical pivots at 76 and 77 to provide planar movement of the injector 59 over a windshield surface.

The embodiment of FIG. 8b is similar to that of FIG. 8a, but combines an additional third translational mode of movement of the injector enabled by sliding a carriage structure like that of FIG. 1 along a rail 73, similar to the rail 25 of FIG. 1 and supported by the same type of bridging structure as provided in FIG. 1. In this embodiment the carriage frame plate 74 carries] pairs of wheels for grasping the rail 73 in manner similar to the carriage frame plate 31 of FIG. 2 with wheels grasping the rail 25. Arm 72 is pivoted upon plate 74 with a generally vertical pivot parallel to pivot 77.

Figure 9:
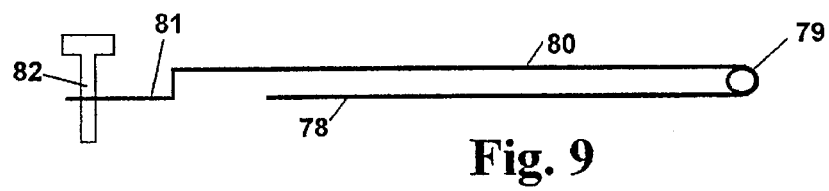
FIG. 9 is a schematic illustration of apparatus for spring biasing toward a windshield surface an injector supported by one of the sliding rail-like arms of FIGS. 7 or 8.

Because of the curvature of some windshields, a conventionally sized injector when used in combination with a biasing spring, as in FIG. 7, will not have sufficient travel normal to the windshield to enable the injector to be kept pressed against the windshield surface when being moved along the entire length of a crack being repaired. This problem does not exist in the embodiment of FIGS. 1–2 where the length of the arm 36 can be made sufficient to provide a much larger range of injector travel normal to the windshield. Increasing the length of the arm portion 37 of FIG. 2 will provide a corresponding increased travel of the injector in the end of the arm as the arm 36 is pivoted relative to the windshield. A similar increase in the range of injector travel for the embodiments of FIG. 7 can be achieved by means illustrated schematically in FIG. 9 wherein a rail member 78 is intended to be used in place of rail 58 of FIG. 7. Spaced from the rail bar 78 above one end thereof is a pivotal support 79, having a pivot axis generally parallel to the windshield, for one end of an injector carrying arm 80 which extends in spaced overlying relationship generally parallel to and beyond the other end of the rail 78 where a stepped portion 81 of the arm 80 drops to a position beyond the end of the rail 78. An injector 82 is mounted in the stepped portion 81 of the arm 80 Any suitable spring means may be used between rail 78 and arm 80 or at the pivotal connections between these parts to bias the arm 80 toward rail to press the discharge end of the injector 82 against the windshield crack being repaired as described previously.

Figure 11:
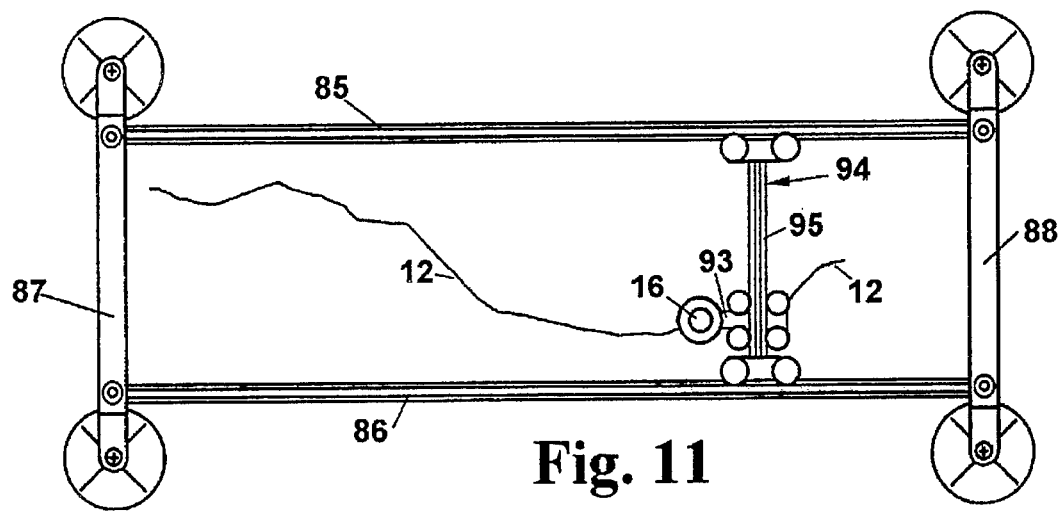
FIG. 11 is an illustration of a further embodiment similar to that of FIG. 10 and having a first carriage spanning the two parallel rails and movable longitudinally along a crack and a second injector-carrying carriage movable on the first carriage transversely of the crack to enable guiding the injector over the length of a crack between the parallel guide rails.
Figure 10:
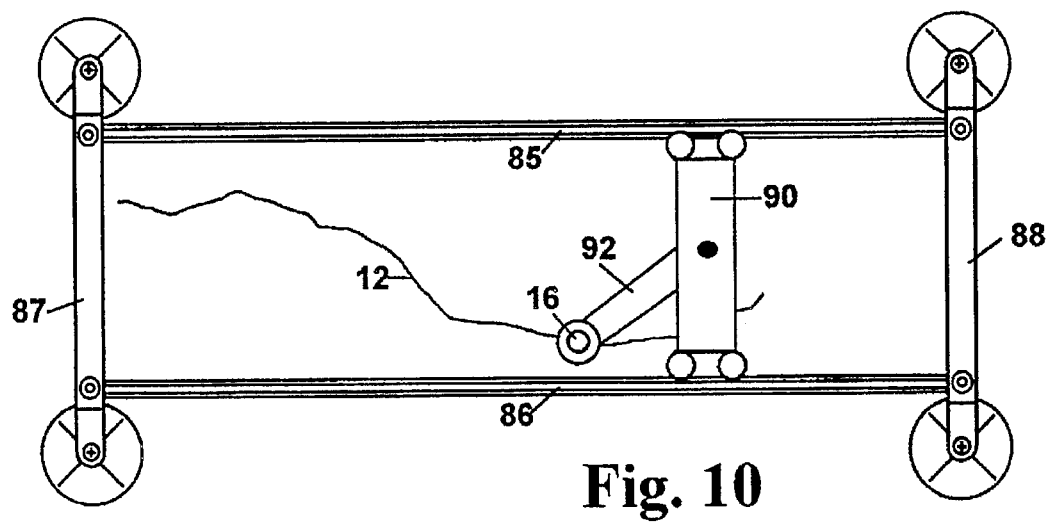
FIG. 10 is an illustration of a further embodiment as seen looking at a windshield and showing a crack-encircling frame comprising two spaced parallel rails secured in bridging relationship over a windshield crack and having a carriage spanning the two parallel rails and movable longitudinally along the crack and an injector-carrying arm structure swingably movable on the carriage to enable guiding the injector over the length of the crack between the parallel guide rails.

Other embodiments of the invention are shown in FIGS. 10–11 wherein a bridging frame structure for supporting the movable injector comprises a pair of spaced parallel rails 85 and 86 which are supported at their opposite ends by bridging structure members 87 and 88 in the manner of the bridging structure members 23 and 24 supporting the single rail 25 of FIG. 1 and 4–6. Spanning the two rails 85 and 86 and slidable therealong is a carriage 90 having a transversely swingable arm 92, as in FIG. 10, or a translatable arm 93 on a secondary wheeled carriage 94, as in FIG. 11. Each of the arms 92 and 93 carries an injector 16 which will be held by suitable spring biased means to keep the discharge end of the injector pressed against the windshield surface being repaired as previously described. The spring biasing may be achieved by biasing the arm as in FIG. 2 or by biasing the injector relative to the arm as in FIG. 7. The embodiments of FIGS. 10 and 11 area believed to possess some advantages in stability over the embodiment of FIG. 1 because of crack encircling or enclosing nature of the bridging frame structure and the shorter lengths of the carriage 90 or the rail portion 95 which is torsionally stressed by the forces applied by the arms 92 and 93.

In all of the illustrated or described embodiments the joints between relatively movable rolling, pivoting or sliding parts should have close fits with no lost motion, and the supporting parts should have sufficient stiffness or rigidity, to assure that the injector in each case is firmly held in any manually adjusted position during its movement along the entire length of a crack being repaired.

Other variations within the scope of this invention will be apparent from the described embodiment and it is intended that the present descriptions be illustrative of the inventive features encompassed by the appended claims.

What is claimed is:

1. Apparatus for repairing an elongated crack in a surface layer of a vehicle windshield by injector means movable along the crack to inject a transparent filler into the crack along its length, said apparatus comprising a bridge structure having one or more feet for resting on the windshield, means for securing said bridge structure to the windshield, said injector means comprising an injector having a portion engageable with the windshield and overlying the crack with a filler discharge opening facing the crack in a preferred orientation of the injector to dispense filler into the crack, a movable carrier carrying said injector, interconnecting means between said bridge structure and said carrier for supporting and guiding said carrier to enable movement of the injector in contact with the windshield surface along the crack in any direction generally parallel to the windshield to enable the injector to trace the path of the crack and for maintaining the injector in said preferred orientation for dispensing filler into the crack as the injector is moved along said crack during a crack repair operation.

2. Apparatus for repairing a windshield crack according to claim 1 wherein said bridge structure has a frame lying at one side of the crack and said interconnecting means extends from said frame toward said crack.

3. Apparatus for repairing a windshield according to claim 1 wherein said bridge structure has a frame extending along opposite sides of the crack and said interconnecting means comprises a secondary bridge structure movable along said frame and over the crack and means supporting the injector carrier from said secondary bridge for movement of the injector relative to said secondary bridge to enable the injector to trace the path of the crack for dispensing filler into the crack as the injector is moved along said crack during a crack repair operation.

4. Apparatus for repairing an elongated crack in a surface layer of vehicle windshield by injector means movable along the crack to inject a transparent filler into the crack along its length, said apparatus comprising a bridge structure having a plurality of feet securable to the windshield at spaced points, said injector means comprising an injector having a portion engageable with the windshield and overlying the crack with a filler discharge opening facing the crack in a preferred orientation of the injector to dispense filler into the crack, said bridge structure having a guide rail structure extending along the length of the crack, a movable carrier carrying said injector, interconnecting means between said bridge structure and said carrier for supporting and guiding said carrier to enable movement of the injector in contact with the windshield surface along the crack and for maintaining the injector on said carrier in said preferred orientation for dispensing filler into the crack as the carrier is moved along said crack during a crack repair operation.

5. Apparatus according to claim 4 wherein said interconnecting means comprises at least two members which are movable relative to each other to enable movement of the injector to follow the crack during a crack repair operation.

6. Apparatus according to claim 4 wherein said interconnecting means provides a combination of rotational and translational movements of the carrier to enable movement of the injector to follow the crack during a crack repair operation.

7. Apparatus according to claim 4 wherein said interconnecting means includes spring means for biasing said injector into engagement with the surface of the windshield as the injector is moved along the crack during injection of filler into the crack while performing a windshield repair operation.

8. Apparatus according to claim 7 wherein said spring means comprises a coil spring.

9. Apparatus according to claim 8 wherein said interconnecting means includes a spring biased pivotable arm having an injector carrying portion which is biased toward the windshield surface by said spring means.

10. Apparatus according to claim 5 wherein said interconnecting means comprises parallel elongated guiding surfaces on one of said members and follower members on another of said members, said follower members being in engagement with said guiding surfaces to assist in guiding movement of and orientation of the injector as it is moved along the crack during injection of filler into the crack while performing a windshield repair operation.

11. Apparatus according to claim 10 wherein said follower members are a plurality of wheels which are in rolling engagement with and are guided by said elongated guiding surfaces.

12. Apparatus according to claim 4 wherein said interconnecting means comprises two sets of relatively movable members, said sets providing two respective different modes of guided movement of the injector relative to and generally parallel to the windshield.

13. Apparatus according to claim 12 wherein said sets of relatively movable members can simultaneously provide two different modes of translational guided movement of the injector relative to and generally parallel to the windshield.

14. Apparatus according to claim 13 wherein said sets of relatively movable members can simultaneously provide respective different translational and rotational modes of guided movement of the injector relative to and generally parallel to the windshield.

15. Apparatus for repairing an elongated crack in a surface layer of a vehicle windshield by means of an injector movable along the crack to inject a transparent filler into the crack along its length, said apparatus comprising a bridge structure having a plurality of feet for resting on the windshield at spaced points along the crack, means for securing said bridge structure to said windshield, said bridge structure having a guide rail structure extending along the length of the crack.

a movable carriage supported on said guide rail structure, an injector carried by said carriage and secured to said carriage by means enabling said injector to be kept in contact with the windshield and properly oriented with respect to the crack to inject said filler into the crack continuously as the carriage is moved along said guide rail structure.

16. Windshield repair apparatus according to claim 15 including a structure connected between said carriage and said injector which provides means for enabling the injector to move transversely relative to the guide rail structure and generally parallel to the surface layer to be repaired.

17. Windshield repair apparatus according to claim 15 including means for maintaining said carriage in a predetermined orientation relative to the guide rail structure as said carriage is moved along the guide rail structure.

18. Windshield repair apparatus according to claim 15 including means for resiliently biasing said injector into contact with the windshield surface during injection of said filler into the crack.

19. Windshield repair apparatus according to claim 16 wherein the structure connected between the carriage and the injector comprises an arm having an injector carrying portion swingable toward and away from the windshield surface to enable the injector to be kept in contact with the windshield surface during repair of the crack.

20. Windshield repair apparatus according to claim 19 wherein said arm is swingable relative to the carriage and generally parallel to the surface of the windshield during repair of the crack.

21. Windshield repair apparatus according to claim 15 wherein said guide rail structure has parallel carriage orienting and supporting surfaces extending along its length and said carriage has follower means engaging said orienting and supporting surfaces to fix the orientation of the carriage as it moves along the guide rail structure during repair of the crack.

22. Windshield repair apparatus according to claim 16 wherein said injector is carried by a pivotable support arm on an intermediate pivotable support means between the support arm and the carriage.

23. Windshield repair apparatus according to claim 22 wherein the injector is pivotable relative to the intermediate pivotable support means about an axis which extends generally parallel to the surface of the windshield and the intermediate pivotable support means is pivotable relative to the carriage about an axis which is generally perpendicular to the surface of the windshield during repair of the crack.

\* \* \* \* \*